May 28, 1940.  J. H. COPE  2,202,310
POWER OPERATED SWEEP RAKE
Filed April 15, 1939  3 Sheets-Sheet 1
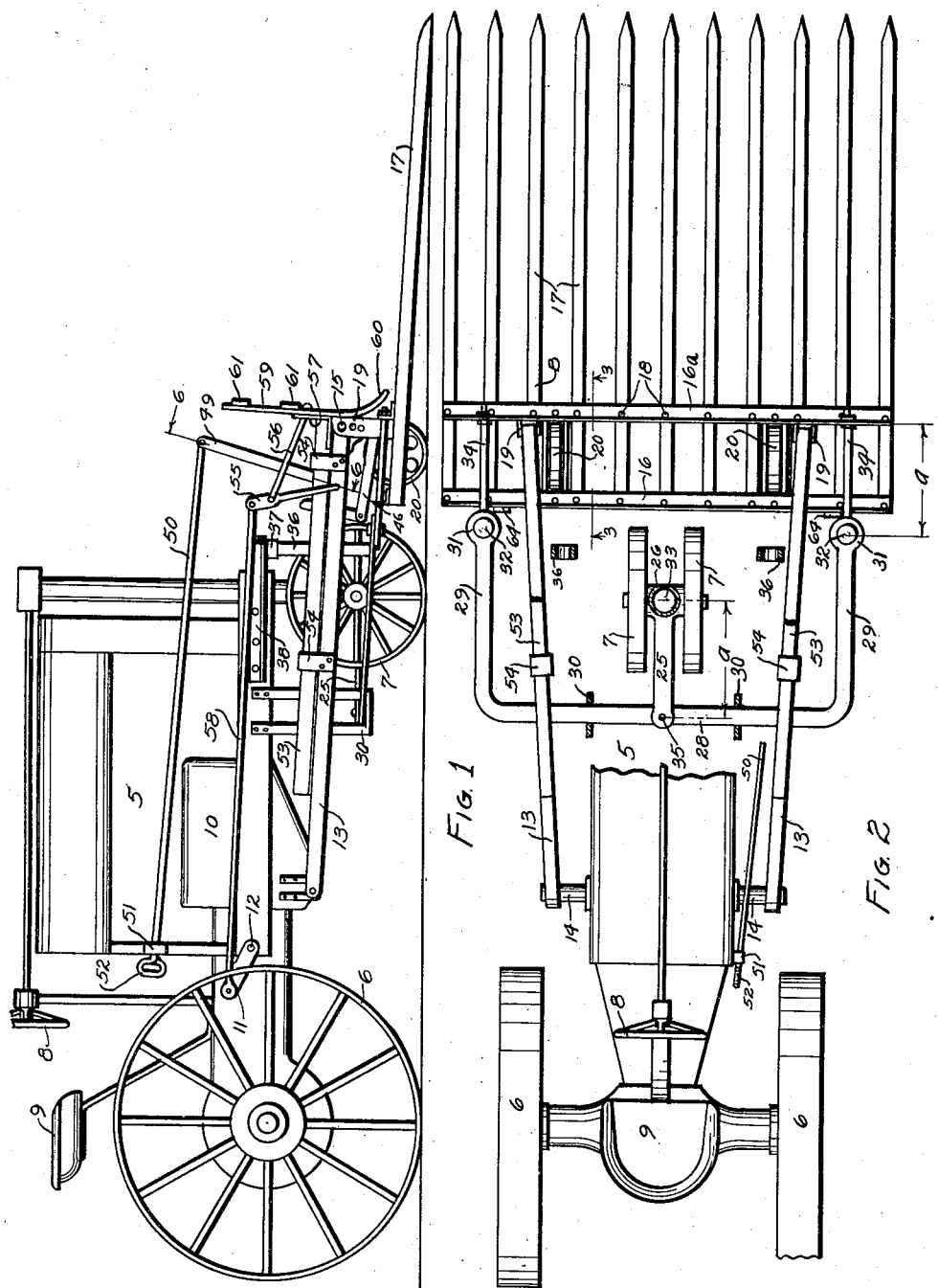
Inventor:
Joseph H. Cope
By Martin E. Anderson
Attorney May 28, 1940.                J. H. COPE                2,202,310
                      POWER OPERATED SWEEP RAKE
                       Filed April 15, 1939          3 Sheets-Sheet 2

Inventor:
Joseph H. Cope
By
Martin E. Anderson
Attorney

May 28, 1940.  J. H. COPE  2,202,310

POWER OPERATED SWEEP RAKE

Filed April 15, 1939   3 Sheets-Sheet 3

Inventor:
Joseph H. Cope
By
Martin E. Anderson
Attorney

Patented May 28, 1940

2,202,310

UNITED STATES PATENT OFFICE 2,202,310

POWER OPERATED SWEEP RAKE

Joseph H. Cope, Denver, Colo.

Application April 15, 1939, Serial No. 267,969

16 Claims. (Cl. 56—27)

This invention relates to improvements in power operated sweep rakes and has reference more particularly to an improved construction of the rake shown and described in my Patent No. 2,147,884, dated February 21, 1939.

In the operation of sweep rakes of the type to which this invention relates, and especially where such rakes are operated by means of tractors, it is necessary to move the rake in a crooked path so as to distribute the hay equally along all parts of the rake head.

With rakes constructed in the manner shown and described in the patent above identified, it is obvious that if the direction in which the tractor travels is changed from a straight line during the loading operation, the rake teeth will move sidewise and be subjected to severe strains that occasionally are of sufficient severity to break the teeth.

It is the object of this invention to produce a rake construction in which means is provided for adjusting the direction of the rake teeth so that they will at all times point substantially in the direction of travel.

Another object of this invention is to provide supporting wheels for a rake head of a power operated rake which will move in such a way that their plane of rotation is always parallel to the rake teeth.

Another object of this invention is to provide a sweep rake of this type which shall have a tilting means carried directly by the rake head and by the pusher bars in such a way that it will latch and remain in latched position without the assistance of any means connected with the tractor.

Another object of this invention is to provide a power operated rake having teeth pivotally connected to a transverse bar and interconnected in such a way that they always remain parallel to each other and to provide means interconnecting the teeth of such a rake head with the steering mechanism of a tractor in such a way that whenever the direction in which the tractor travels is altered, the direction of the teeth will automatically be changed to the desired extent so as to point in the direction in which the tractor travels.

The above and other objects that may become apparent as this description proceeds are attained by means of a construction and an arrangement of parts that will now be described in detail and for this purpose reference will be had to the accompanying drawings in which the invention has been illustrated, and in which:

Figure 1 is a side elevation of a tractor operated sweep rake constructed in accordance with this invention;

Figure 2 is a top plan view of the assembly, parts being broken away and other parts omitted to better disclose the construction;

Figure 3:
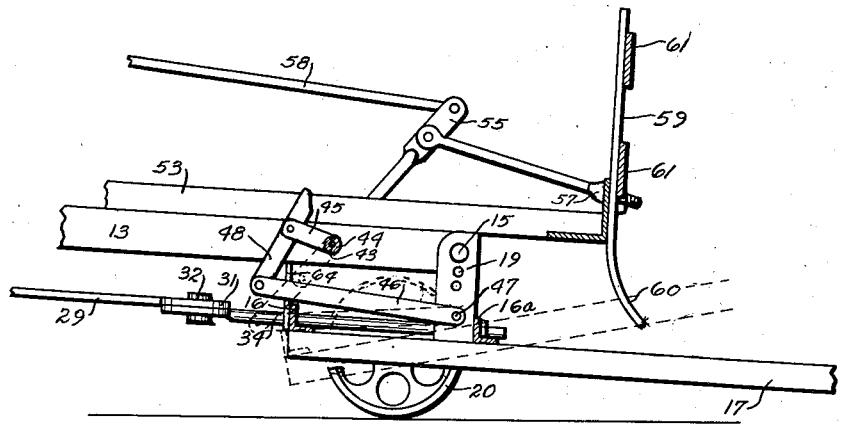
Figure 3 is an enlarged showing of that portion of Figure 2 taken on line 3—3, and illustrates the tilting means employed, as well as the push-off device, the tilted position of the rake head being shown in dotted lines.
Figure 4:
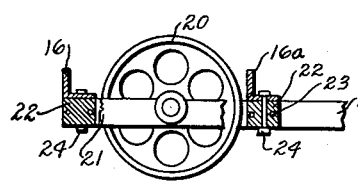
Figure 4 is a section taken on line 4—4, Figure 5, and shows the manner in which the supporting wheels are attached to the rake head.

In the drawings reference numeral 5 designates a gasoline driven tractor of usual construction. Since no novelty is claimed for the tractor, only such portions thereof as cooperate with the present improved sweep rake will be described. Numeral 6 designates the rear drive wheels and numeral 7 the front or dirigible wheels which are controlled by means of a steering mechanism having a steering wheel 8 positioned adjacent the pilot seat 9. The front or dirigible wheels 7 can be turned about a vertical pivot by means of wheel 8 in a well known manner. The engine has been designated by reference numeral 10 and reference numeral 11 designates the crank arm of a tool lift which extends from and is attached to a shaft 12 that is operated by the engine motor in such a way as to make a movement of 180 degrees during each operation. Secured to opposite sides of the tractor are pusher bars 13 that are pivoted at 14. These bars extend forwardly in the summer shown in the drawings and are provided at their forward ends with openings for the reception of pivot pins 15. The rake head is formed by two transverse, parallel bars 16 and 16a which have been shown as formed from angle iron. A plurality of rake teeth 17 extend across the transverse bars and are pivotally connected to the latter by pivots 18. The rake teeth are parallel and the transverse bars and the rake teeth portions which interconnect them form unstable rectangles whose angular relation can be changed by shifting the transverse bars relative to each other. upwardly extending brackets 19 are secured to the front bar 16 and have their flanges provided with openings for the reception of the pivots 15. It will be noted that the pivot 15 is positioned some distance above the plane of the rake teeth and therefore any force exerted by the pusher bars will tend to press the front of the teeth against the ground so as to produce ground pressure during operation. The rake head is supported on wheels 20. These wheels are pivoted between two parallel supporting bars 21 whose front and rear ends are separated by spacing blocks 22 to which they are attached by means of rivets 23. The wheel frames comprising parts 21 and 22 are pivotally attached to the transverse bars 16 and 16a by means of bolts or other pivot pins 24. The wheels are so positioned that they are parallel with the rake teeth and when the transverse bars are moved longitudinally relative to each other, the wheels 20 and the rake teeth 17 will remain parallel, regardless of the angle that they make with the transverse bars.

The objects sought to be obtained by shifting the angular relation between the teeth and the transverse bars is to shift the teeth when the tractor is turned so as to have the teeth always pointing in the direction of travel or substantially in such a direction. As above mentioned, it is quite customary to drive the tractor and rake in a zigzag course along a windrow so as to load the hay equally over the whole width of the rake and with a rake constructed in the manner shown and described in the patent above identified, where the teeth always project in the direction of the body of the tractor, regardless of the direction in which it is moving, very severe strains are imposed on the teeth during such transverse movement but by the construction herein shown and described these strains are obviated, because the teeth always point in the direction of travel.

I will now describe one way in which the rake teeth are interconnected with the steering mechanism of the tractor so as to effect a shifting of the rake teeth when the tractor travels to one side or the other of a straight line.

Referring now more particularly to Figure 2, it will be seen that a crank arm 25 extends rearwardly from the front axle 26 at a point midway between the wheels 7. A rigid bar 28, whose ends 29 are bent forwardly so as to form a shape resembling a wide U is attached to the tractor by means of two supporting stirrups 30. The ends 29 have been shown as terminating in wide circular portions 31 that are each provided with a central opening for the reception of a pivot pin having a large circular head 32. Whenever the wheels 7 are turned about their vertical pivot 33 by means of the steering wheel 8, arms 25 will be moved to one side or the other of the center and shift the bar 28 in a corresponding manner. Pivotally attached to the front ends of arms 29 by means of the pivots 32 are short bars or rods 34 whose front ends are movably connected to the forward transverse bar 16a in such a way as to have a limited tilting movement relative thereto. The upwardly extending flange of the transverse bar 16 is notched in positions directly beneath the arms 34 when the parts are positioned as shown in Figure 2 so that when the rake is in the position shown by full lines in Figure 3, bars 34 will extend into these notches in the manner indicated by the position of parts 16 and 34. The parts are so proportioned that the distance from the pivots 33 to the pivot point 35 where the arm 25 is connected with the bar 28, and which distance has been indicated on the drawing by reference character a, is the same as the distance from pivot pin 32 to the vertical flange of the transverse bar 16a. It will now be seen that the pivots 32 and 35 move equal distances and this assures that whenever the steering wheels 7 are turned, the rake teeth will always move in such a way as to remain substantially parallel with the planes of rotation of wheels 7. The position of the parts during turning towards the right has been indicated diagrammatically in Figure 7 and if the tractor is being turned towards the left, the parts will assume the reverse position shown in Figure 8.

Attention is now directed to the fact that wheels 20 are constrained to move in such a way as to always remain parallel with the rake teeth. In the above description the shifting of the rake teeth angularly with respect to the transverse bars has been described as effected by means of the rigid bar 28 and arms 34. It will now be shown how the rake teeth will automatically assume a position in which they point in the direction of movement in the absence of the interconnection between the steering mechanism and the bars which connection has just been described.

Figure 6:
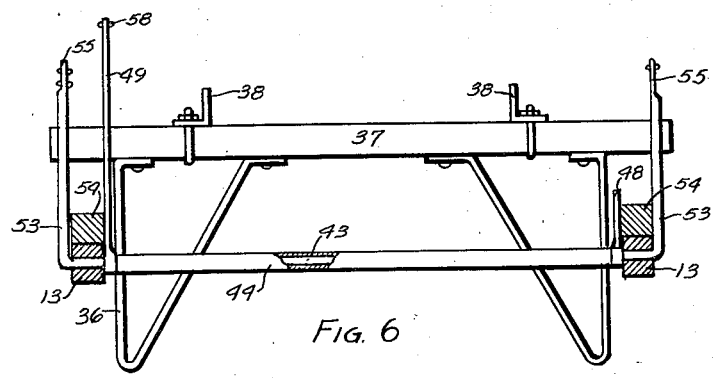
Figure 6 is a section taken on line 6—6, Figure 1, and shows the guides which serve to limit transverse movement of the pusher bars with respect to the tractor.

Attention will first be called to the fact that guide members 36 project downwardly from a transverse bar 37 that is supported from forwardly extending angle irons 38 attached to the sides of the tractor. The guides 36 limit the transverse movement of the pusher bars 13 relative to the tractor in the manner shown in Figure 6.

Let us now assume that the interconnecting means comprising the bar 28 and arms 34 is disconnected from the rake and that the rake is being pushed forwardly by the tractor and the arms 13. It will be noticed that the pusher arms are connected to the transverse bar 16a which is positioned in front of the wheels and that the wheel frames comprising bars 21 and block 22 are pivoted at their front ends to this bar. The result is that wheels 20 operate in the manner of caster wheels and always tend to rotate in a plane which coincides with the direction of movement.

Figures 7, 9:
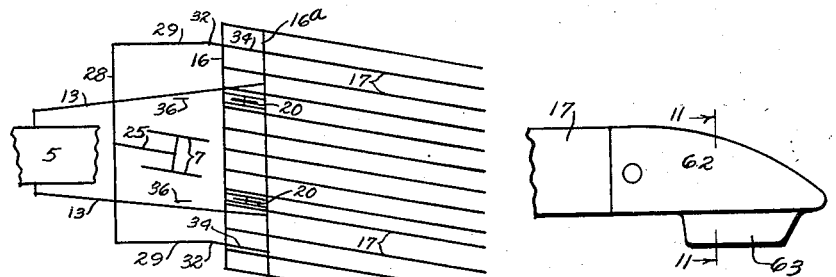
Figure 7 is a diagrammatic view showing the position of the front wheels of the tractor and of the rake teeth and rake head supporting wheels when the tractor is moving away from a straight line, the interconnecting means being that shown in Figure 2.
Figure 9 is a side view of the tip of a rake tooth showing an improved metal tip or shoe in place thereon.

If we assume that the tractor is traveling in a straight line and the steering mechanism is operated to turn it sharply towards the right, the pusher arm 13 on the right will engage the guide 36 and will exert a force on the transverse bar 16 tending to move it towards the right, and this will cause the wheel frames and wheels to turn about their pivotal connections, thereby shifting the rear transverse bar towards the left so as to bring the parts into the position shown in Figure 7. If the direction of travel is shifted towards the left, the parts will move in the opposite direction, but the tendency will be to keep the plane of rotation of the supporting wheels and the teeth parallel with the direction of travel. Although the rake will theoretically align itself to the direction of travel in the absence of means interconnecting it with the steering mechanism, such interconnecting means is desirable for the reason that during the loading operation, forces may be produced that would be sufficient to overcome the directive forces produced by the castor action of wheels 20.

Figure 5:
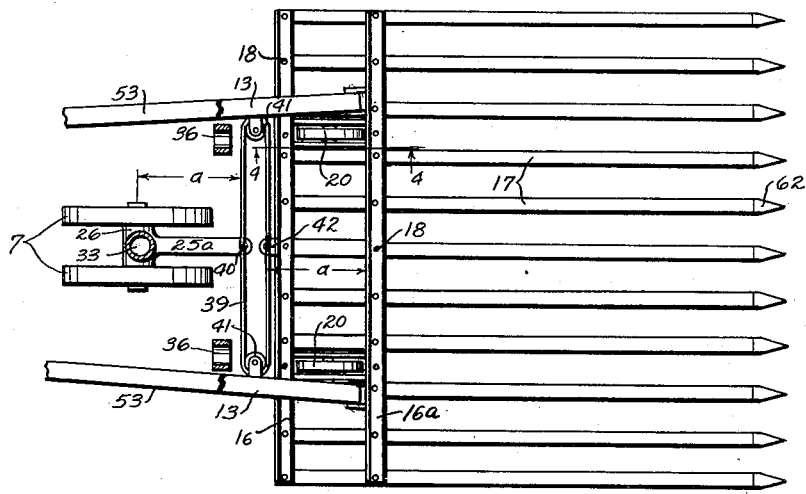
Figure 5 is a top plan view of a rake head constructed like that illustrated in Figure 2, but in which a specifically different means has been shown for tilting the rake teeth in accordance with the direction of the dirigible wheels of the tractor.
Figures 8, 10:
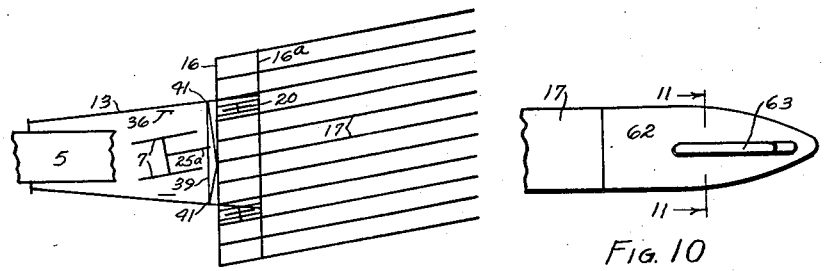
Figure 8 is a view somewhat similar to that shown in Figure 7, but shows the rake teeth tilted in the opposite direction and also shows the interconnecting means illustrated in Figure 5.
Figure 10 is a bottom plan view looking in the direction of arrow 10 in Figure 9.

In Figures 5 and 8, another means for interconnecting the rake head with the steering mechanism has been shown which can be substituted for the means illustrated in Figures 2 and 7. It will be seen from Figure 5, that arm 25a projects forwardly from the axle 26 and that cables 39 are attached to the front end of arm 25a at the point indicated by numeral 40. These cables pass over grooved pulleys 41 secured to the inside of the pusher bars 13. The other ends of the cables are attached to the rear end of one of the rake teeth at the point designated by reference numeral 42. The distance from the pivot 33 to the point 40 has been designated by reference character a and this is equal to the distance from pivot point 42 to the pivot point 18 on bar 16a and therefore whenever the front wheels are turned in one direction or the other, the unstable rectangle formed by the transverse bars and the rake teeth will be shifted in a corresponding manner so as to move the rake teeth angularly at the same rate as that of the wheels 7 whereby they will remain parallel with the direction in which the tractor is traveling.

In the above two specifically different means for interconnecting the rake head with the steering mechanism have been described and it is probable that other means can be devised, as this is merely one element of the combination, any mechanical equivalent of the means can be substituted within the scope of the invention.

When the rake is in operation the teeth must, of course, follow the surface of the ground in the manner indicated in Figure 1, but after the load has been gathered, the rake must be tilted so as to move it out of contact with the ground, during transportation to the place of unloading. In order to effect this tilting, means has been provided which will now be described.

A long shaft or rod 43 extends between the pusher bars 13 in a manner indicated in Figure 3 and this shaft is surrounded by a tube 44 that, in turn, is provided with crank arms 45 adjacent each of the pusher bars. A bar 46 is pivoted to each of the vertical brackets 19 at point 47 and extends rearwardly beyond the transverse bar 16. A link 48 connects the rear end of bar 46 with the end of crank arm 45 and the parts are so adjusted that when the tubular member 44 is rotated counterclockwise, it will tilt the rake head about pivot 15 from the full line to the dotted line position shown in Figure 3 at which position the links 48 and crank arms 45 will form an overset toggle. An arm 49, shown in Figure 1, is attached to the tube 44 and extends upwardly for some distance and to the upper end of this arm a rod 50 is pivoted. This rod extends rearwardly to a point within reach of the driver of the tractor where it passes through a guide 51 and terminates in a handle 52. When the operator or driver wants to raise the rake head from the ground, he exerts a pull on rod 50 sufficient to turn the tubular member 44 and move the parts into tilted position, whereupon they will remain latched until released by a forward movement of the rod 50.

Attention is called to the fact that this tilting mechanism is connected directly with the rake head and is so constructed as to interlock and this obviates the necessity of providing the tractor with the usual pivoted handle and interlock, which has been previously employed to effect a similar function.

When the load has been transported to the stack or other place where it is to be unloaded, the rake is released so as to rest on the ground in the manner shown in Figure 1 and the tractor is reversed so as to travel rearwardly. Unless some push-off mechanism is provided the load will not leave the rake head and in order to unload the rake, means has been provided which will assure this operation and this means will now be described.

Referring more particularly to Figures 1 and 3 it will be seen that bars 53 are supported on the pusher bars 13 for longitudinal movement thereon. Guide loops 54, attached to the pusher bars 13, encircle bars 53 and keep them in parallel alignment with the pusher bars. Shaft 43 has both ends bent upwardly and these terminate in flattened portions 55, as shown in Figure 1. Links 56 are pivotally connected with the flattened portions 55 and with the angle bar 57 that is attached to the front ends of bars 53. A rod 58 extends from the flattened portions 55 to the end of the crank arm 11 of the tool lift device which comprises shaft 12, and which has been referred to above. When the rake is to be unloaded, the operator connects the tool lift device with the engine by the means provided therefor, which has not been shown, whereupon crank arm 11 will move 180 degrees and push the bars 53 forwardly into the position shown in Figure 3. When the tool lift is again energized, the crank arm will complete the revolution and will assume the position shown in Figure 1.

Attached to the vertical flange of member 57 are a plurality of flat steel bars 59 whose lower ends 60 are forwardly curved. Boards 61 connect the bars 59 and form what may be termed a fence against which the hay rests and which serves to push the hay off from the rake during the unloading operation.

Push-off devices have been used in connection with power operated sweep rakes, especially in connection with horse drawn rakes, but it is believed that so far no one has constructed a rake in which the push-off is operated by the tool lift mechanism of the tractor.

Attention is also called to the fact that in the construction illustrated and described, the push-off is carried by the pusher bars so as to be movable in a straight line, and this makes it possible to employ the tool lift for operating the pushoff, but other means may be employed if found desirable such as a hand operated lever or means engaging the surface of the ground as is now old.

Special attention is called to the fact that by supporting the rake head on wheels or runners and connecting it with the tractor in front of the supporting means, forces are produced which have a tendency to make the wheels or runners extend in the direction of movement. When the wheels or other supporting means are pivoted to the rake head in the manner of castor wheels these will always adjust themselves to the direction of movement and when the supporting means is connected with the pivoted rake teeth, they will serve to adjust the latter so as to point in the direction of travel. The pusher bars are in fact a portion of the means for effecting an adjustment of the supporting means and the teeth and by so positioning the wheels or supports that their vertical pivots are spaced a sufficient distance from the ground contact of the supports, the supports and teeth will adjust themselves so as to always point in the direction of travel. The pusher bars or equivalent means serve as the means by which the steering mechanism shifts the supporting means and the teeth.

Figure 11:
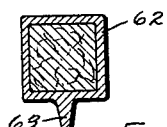
Figure 11 is a section taken on line 11—11, Figures 9 and 10.

In Figures 9, 10 and 11, a rake tip 62 has been illustrated which will now be described. This rake tip consists of a hollow metal member of the shape shown in the drawing and which is provided on its lower side with a rib 63 that cuts into the sod during the loading operation and which prevents strains from breaking the rake teeth.

Upwardly extending guide members 64 are attached to the vertical flange of the transverse bar 16 and serve to guide the arms 34 into the notches above referred to, after the rake has been tilted.

Figure 12:
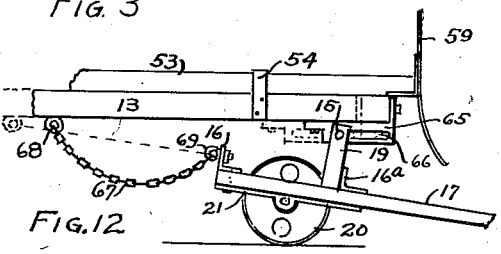
Figs. 12 and 13 show slightly modified constructions.

In the above description it has been explained how the rake and teeth will adjust themselves to the direction of travel due to the castor action of the wheels or other supports. This is due to the fact that the moving force is attached to the rake head in front of the center of the wheels. It is evident that if a force is applied tending to back the rake the castor action will tend to cause the parts to "jack-knife", but this is resisted by the guides 64 engaging the arms 34. When the rake is not connected directly with the steering mechanism, means must be provided to permit backing without "jack-knifing" and an example of such means is shown in Figure 12.

The front ends of the pusher bars may have attached to their under surfaces castings 65 having slots 66 for the reception of the pivot pins 15 so as to provide a lost motion connection between the pusher bars and the rake head. When the assembly is moving forwardly, the parts are in the full line position shown in Figure 12 and operate as above described. In backing, in order to retain the castor action of the wheels 20, the force must be applied to the rear of the wheels and to effect this a chain 67 extends between eye bolts 68 and 69 and its length is so proportioned to the length of the slot 66 that it will become taut before pin 15 engages the forward end of the slot. The force for backing the rake will now be applied to the rear of wheels 20, or, considering the direction of travel, to the front of wheels 20 and they will therefore function as castor wheels and adjust themselves in accordance with the direction of travel, whereby the rake can be backed with the load in raised position without "jack knifing." The chain forms a flexible connection that permits free movement of the rake head during forward travel. It will be observed that each pusher bar is connected with both transverse bars 16 and 16a by a lost motion connection. The two connections are reversed so that the moving force will always be applied to the rake head in front of the wheels 20, both in going forward and in backing.

Figure 13:
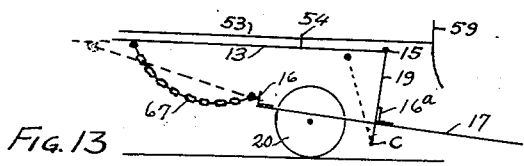

In Figure 13 a slightly different means for effecting the same purpose is shown. In this embodiment, instead of a sliding motion of pivot 15 in a slot, the bar 19 is pivotally attached to bar 16 at c and is free to turn from the full line to the dotted line position and is limited in its forward movement by transverse bar 16.

Having described the invention what is claimed as new is:

1. A sweep rake comprising in combination, a transverse bar, a plurality of teeth extending across the bar, pivotally connected thereto for angular displacement relative to the bar, means comprising a bar spaced from the first mentioned bar and pivotally connected with the teeth for holding them in parallel relation and for effecting a simultaneous adjustment of the teeth relative to the first mentioned bar, supporting wheels attached to the first mentioned transverse bar for movement about a vertical pivot, and means interconnecting the wheels and the rake teeth for maintaining the planes of rotation of the wheels substantially parallel with the rake teeth in all angular adjustments of the latter.

2. A sweep rake, comprising in combination, a transverse bar, a plurality of rake teeth pivotally connected thereto, supporting wheels attached to the transverse bar for swinging movement about pivots parallel with the pivots of the rake teeth, and means comprising a second transverse bar spaced from and parallel with the first transverse bar, pivotally connected with the teeth for effecting simultaneous turning of the teeth about their pivotal connection with the first bar, the wheels being free to turn about their pivotal connection with the first bar to vary the angular relation of their planes of rotation with respect to the first mentioned transverse bar.

3. A sweep rake, comprising in combination, two substantially parallel transverse bars, a plurality of rake teeth pivotally connected, with both bars, means positioned beneath the rake and pivotally connected with one of the transverse bars for supporting the rake a predetermined distance above the ground, force transmitting bars connected with the transverse bar nearer the middle of the rake teeth, and means comprising the force transmitting bars for shifting the transverse bars relative to each other for altering the angular relation between the teeth and the transverse bars.

4. A sweep rake comprising in combination, two spaced, parallel, transverse bars, a plurality of spaced, substantially parallel rake teeth extending across and pivotally connected with both bars, wheel supporting frames pivotally attached at their ends to the transverse bars, rake supporting wheels rotatably connected with the frames, means for shifting the bars longitudinally relative to each other whereby the angular relation of the teeth and bars will be changed, and means comprising the frames for maintaining the planes of rotation of the wheels parallel with the rake teeth in all angular relations of the latter with respect to the transverse bars.

5. A power operated sweep rake, comprising in combination, a tractor, a rake head having a transverse bar, rake teeth pivotally attached to the bar, means attached to the transverse bar for rotation about pivots parallel with the pivotal connections of the rake teeth for supporting the rake head, said means engaging the ground to the rear of the transverse bar, force transmitting means connecting the tractor with the rake head at a point forward of the supporting means, and means comprising the force transmitting means and the supporting means for moving the teeth about their pivotal connection with the transverse bar when the direction in which the tractor travels is changed.

6. A power operated sweep rake, comprising in combination, a tractor, having means for controlling its direction of travel, a rake head having a transverse bar, teeth pivotally attached to the bar, means pivoted to the transverse bar for supporting the rake head a predetermined distance above ground, said means contacting the ground to rear of the pivots, interconnecting means between the teeth and the supporting means to effect simultaneous angular movement, and force transmitting means attaching the tractor with the rake head at a point forward of the point where the latter contact with the ground whereby the supporting means and the teeth will turn about their pivotal connection whenever the direction of travel is changed.

7. A power operated sweep rake, comprising in combination, a tractor, a rake head having a transverse bar, rake teeth pivotally attached to the bar, means pivoted to the transverse bar for supporting the same a predetermined distance above the ground, said means contacting the ground to the rear of the pivots, force transmitting means attaching the tractor with the rake head at a point forward of the point where the pivoted supporting means contacts with the ground whereby the supporting means will turn about their pivotal connections whenever the direction of travel is changed, and means for moving the teeth about their pivots to change their angular relation relative to the transverse bar.

8. A power operated sweep rake, comprising in combination, a tractor, a rake head having a transverse bar, rake teeth pivotally attached to the bar, means pivoted to the transverse bar for supporting the rake head a predetermined distance above the ground, said means contacting the ground to the rear of the pivots, force transmitting means attaching the tractor with the rake head at a point forward of the point where the supporting means contact with the ground whereby the latter will turn about their pivotal connection whenever the direction of travel is changed, and means interconnecting the supports and the rake teeth for effecting a simultaneous pivotal movement of the supporting means and the teeth whenever the direction of travel is changed.

9. A power operated sweep rake of the pusher type comprising in combination, a power driven vehicle having steering means for controlling its direction of movement, a rake head comprising two spaced transverse parallel bars, a plurality of spaced teeth pivotally connected to the bars, means comprising the transverse bars for interconnecting the rake teeth for simultaneous and equal pivotal movement, force transmitting bars having one of their ends connected to the vehicle and their other ends connected with the transverse bar nearest the middle point of the rake teeth, means for supporting the last mentioned transverse bar a predetermined distance above the ground, and means responsive to the operaton of the steering means for moving the rake teeth about their pivots whenever the direction of travel of the tractor is altered.

10. A sweep rake of the pusher type comprising an automotive vehicle having steering means for controlling its direction of travel, a rake head comprising a transverse bar, a plurality of teeth pivoted thereto, means interconnecting the teeth for simultaneous and equal pivotal movement, a pair of pusher bars connecting the transverse bar to the vehicle, means for supporting the transverse bar a predetermined distance above the ground, means for limiting sidewise movement of the pusher bars relative to the vehicle, and means for changing the angular relation between the transverse bar and the teeth whenever the direction of travel is changed by the controlling means.

11. A power operated sweep rake of the pusher type comprising in combination, a vehicle having steering means to control the direction of travel thereof, a sweep rake comprising two spaced transverse bars, a plurality of spaced rake teeth extending across and pivotally connected to both bars, means comprising wheels pivoted to the front transverse bar for supporting the rake, pusher bars connecting the front transverse bar with the vehicle, means for limiting sidewise movement of the pusher bars relative to the vehicle, and means operated by the steering means for shifting the angular relation between the teeth and the transverse bars.

12. A power operated sweep rake of the pusher type, comprising in combination, a power driven vehicle having steering means for controlling its direction of travel, a rake head comprising two spaced transverse parallel bars, a plurality of substantially parallel spaced teeth pivotally connected to both bars, pusher bars connected at their rear ends to the vehicle and at their front ends with the transverse bar nearest the middle point of the rake teeth, means for limiting transverse movement of the pusher bars relative to the tractor, means for supporting the last mentioned transverse bar a predetermined distance above the ground, and means responsive to the moving of the steering means for moving the rake teeth about their pivots in an angular direction.

13. A power operated sweep rake of the pusher type, comprising in combination, a vehicle having steering means for controlling its direction of travel, a sweep rake comprising two spaced transverse parallel bars, a plurality of spaced substantially parallel rake teeth pivotally connected to both bars, means for supporting the rake, pusher bars connecting the front transverse bar with the vehicle, means for limiting sidewise movement of the pusher bars relative to the vehicle, and means comprising the steering means for moving the rear transverse bar longitudinally relative to the front bar whenever the direction of travel is changed, whereby the angular relation of the teeth and bars will be changed to conform to the change in the direction of movement.

14. In a power operated sweep rake, comprising in combination, a tractor having steering mechanism for controlling its direction of travel, a rake head comprising two transverse bars, a plurality of rake teeth extending across and pivotally connected to both bars, and means for maintaining the teeth parallel, power transmitting elements between the tractor and the transverse bar, means comprising wheels for supporting the rake, the wheels being movable about vertical pivots that are substantially parallel with the pivots of the teeth, the center of the wheels being to the rear of their vertical pivotal connection with respect to the direction of movement, whereby they will have a castor action, means for limiting transverse movement of the power transmitting elements relative to the tractor, whereby the supporting wheels will turn about their vertical pivots whenever the direction of travel of the tractor is changed, and means for moving the teeth about their pivots whenever the wheels turn about their vertical pivots.

15. In a power operated sweep rake, in combination, a tractor having a steering mechanism for controlling its direction of travel, a transverse bar, a pusher bar pivotally connected to each side of the tractor, the pusher bars extending forwardly and having a movable connection with the transverse bar, a load carrying device pivotally connected with the transverse bar, a plurality of supporting wheels connected with the transverse bar for oscillation about vertical pivots, the axes of the wheels being to the rear of the pivots whereby they function as castor wheels, means for limiting transverse movement of the pusher bars relative to the tractor, whereby the wheels will move about their vertical pivots whenever the direction of travel of the tractor is altered, and means interconnecting the load carrying device and the wheels for moving the former about its pivot whenever the wheels turn about their vertical pivots.

16. A tractor operated sweep rake comprising, in combination, a rake head having two transverse bars, a plurality of rake teeth extending over and connected with both bars, rake supporting means positioned to contact the ground at a point between the transverse bars, rigid pusher bars extending forwardly from the tractor, a lost motion connection between the pusher bars and the rake head at a point to the front of the support and a lost motion connection between the tractor and the rake head at a point to the rear of the supporting means; the lost motion between the tractor and the rake head being less than the lost motion between the pusher bars and the rake head whereby the force for moving the rake head will always be applied in front of the supporting means regardless of the direction of travel.

JOSEPH H. COPE.